Dec. 8, 1970     E. L. PARR     3,545,276
INDICATOR AND A PRESSURE INDICATING SYSTEM
Filed May 24, 1968     2 Sheets-Sheet 1
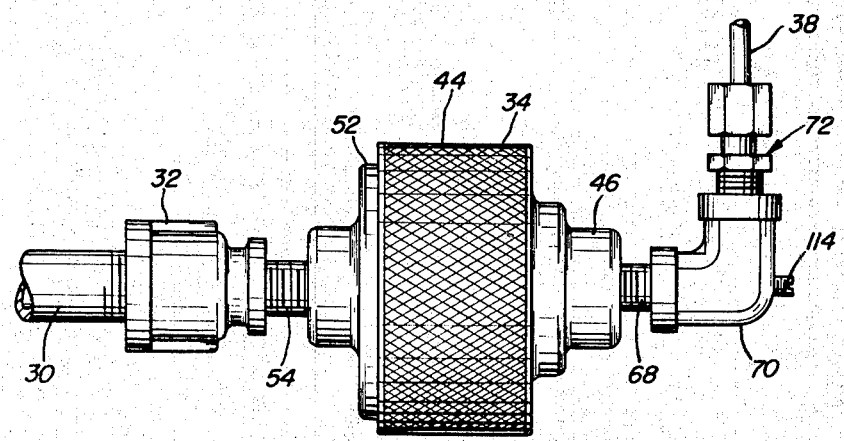
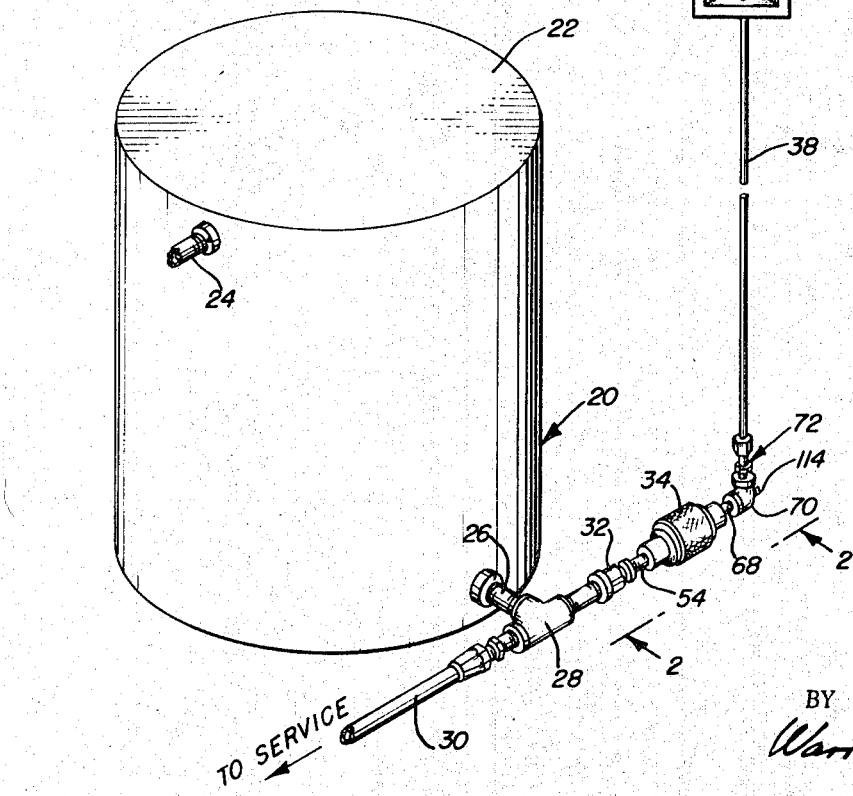
INVENTOR.
EDWARD L. PARR
BY
*Warren H. F. Schmieding*
ATTORNEY

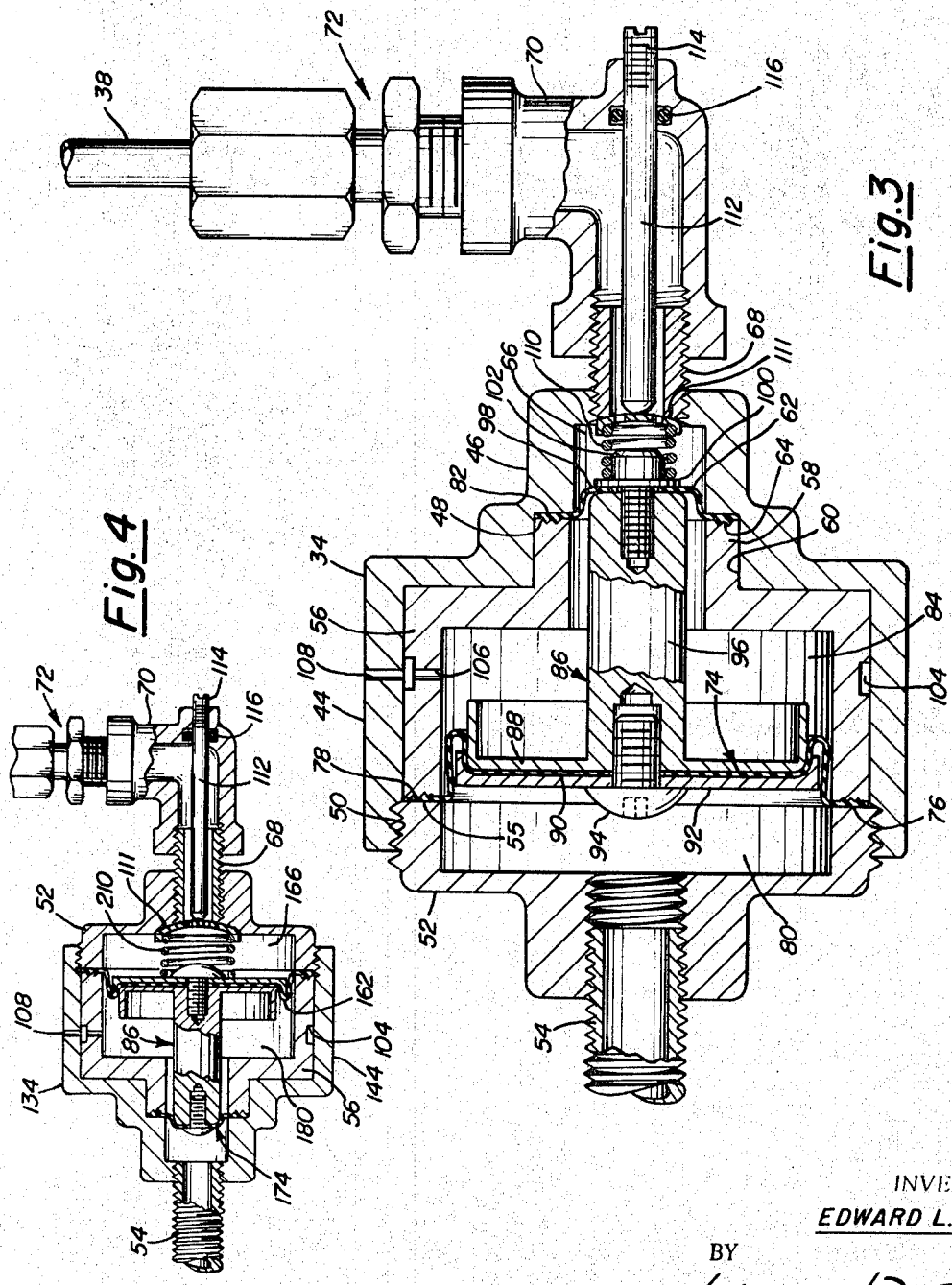

United States Patent Office 3,545,276
Patented Dec. 8, 1970

3,545,276
INDICATOR AND A PRESSURE INDICATING SYSTEM
Edward L. Parr, El Cajon, Calif., assignor to Wendell L. Thompson, Burbank, Calif.
Filed May 24, 1968, Ser. No. 731,842
Int. Cl. G01l 7/08
U.S. Cl. 73—407
2 Claims

ABSTRACT OF THE DISCLOSURE

A system for indicating pressure including a pressure responsive indicator and two variable capacity chambers, one being of different capacity than the other, one being connected with a source of variable pressure and the other being connected to the indicator, the latter chamber being varied in capacity to thereby vary the pressure therein by variation in capacity in the former chamber and also varied in pressure by adjusting the effect of a spring in the second mentioned chamber from the exterior thereof.

BACKGROUND OF THE INVENTION

Field of the invention

The invention is directed to a pressure indicating system wherein an instrument indicates variations in pressure as, for example the hydrostatic head of liquid in a vessel. In one form of the invention, the results of minute changes in pressure are amplified to provide enlarged indications of variation in pressure. In another form, the results of changes in pressure are minimized to provide for reduced-in-size indication of large changes in pressure.

Furthermore, the indicator can be of the type in which the value it indicates is by its obscuring movement over fluorescent material.

Description of the prior art

Applicant is aware of systems of the type employing liquid for indicating the hydrostatic head of liquid in a vessel. In each of those systems the height of the liquid indicator is commensurate with the height of the vessel, i.e., the ratio of the heights of the vessel and indicator is one-to-one. Applicant's system of indication employs a differential whereby the ratio size of the indicator can be materially varied in either direction, i.e., for example, a short indicator, like a doctor's thermometer, can be employed to measuring the liquid level in a large water storage tank or a relatively large indicator that can be read across a laboratory can be employed to measure minute heights of liquid in a small cell.

BRIEF SUMMARY OF THE INVENTION

Some of the purposes of the present invention have been explained in the preceding paragraph. A differential, fluid-pressure element is employed in practicing the invention. This differential element employs two closed fluid chambers, one of which is an actuating chamber in that it is responsive to the pressure to be measured, as for example only, the hydrostatic head of liquid, and the other chamber responds to the pressure in the actuating chamber to actuate an indicator. The differential may be of the subtracting type or of the multiplying type. Thus large variations in pressure to be measured can be indicated by small movements of the responsive chamber, and vice-versa.

Other features and the advantages of the present invention will be apparent from the following description, reference being had to the accompanying drawings wherein preferred embodiments of the invention are illustrated.

BRIEF DESCRIPTION OF THE DRAWINGS

FIG. 1 is a diagrammatic view of the improved system;
FIG. 2 is a side view of the differential, fluid responsive element shown in FIG. 1, but on a larger scale;
FIG. 3 is a longitudinal sectional view of the element shown in FIG. 2, but on a larger scale;
FIG. 4 is a longitudinal sectional view of a differential, fluid pressure responsive element similar to that shown in FIG. 3, but on a smaller scale, the differential characteristics being the reverse of that shown in FIG. 3;
FIG. 5 is a fragmentary view of a tube type indicator that can be employed in the system; and
FIG. 6 is a sectional view taken along line 6—6 of FIG. 5.

DETAILED DESCRIPTION OF THE INVENTION

Referring first to FIG. 1, the system 20 includes a tank 22 having a liquid inlet 24 and a liquid outlet 26. The liquid outlet 26 is conected by a T 28 to the service pipe 30 and by suitable coupling 32 to a differential, fluid pressure responsive element 34. This element 34 is connected to an indicator 36, for example herein shown as the fluid type including a tube 38. Section 40 of the tube which is in the indicator 36 contains preferably an opaque liquid. The rear of section 40 carries a strip of fluorescent material 42. The height of the liquid in tank 22 is registered by the height of the liquid in tube section 40.

Referring now more particularly to FIGS. 3 and 4, the differential, fluid pressure responsive element 34 includes an outer casing 44 which forms, at the right end, a hollow boss 46 having an inwardly facing shoulder 48. The end of the casing 34 opposite the boss 46 is internally threaded, as at 50, for receiving an externally threaded cap 52. The left end of the cap 52 is threaded for receiving a coupling 54 which is a part of the composite coupling 32. As viewed in FIG. 3, the right end of cap 52 provides an abutment 55.

The casing 34 is preferably cylindrical in shape and has a cylindrical inner surface which receives a cylindrical casing 56. The innercasing 56 is provided with a cylindrical boss 58 which extends into a cylindrical opening 60 in the boss 46. A flexible diaphragm 62 is interposed between the shoulder 48 of the boss 46 and the right end 64 of the boss 58.

The right section of the boss 58, together with the diaphragm 62, forms a chamber 66. The chamber 66 is connected by a coupling 68 and an elbow 70 through suitable fittings 72 to the tube 38.

A flexible diaphragm 74 is interposed between the left end 76 of the innercasing 56 and the right end 55 of the cap 52. By tightening the cap 52, the circular flange end 78 of the diaphragm 74 is sealed between the cap and the left end of the casing 56, to provide, with the cap, a chamber 80. Also by tightening the cap 52, end 64 of the hollow boss 58 of the innercasing 56 provides a seal between the outer circular flange 82 of the diaphragm 62 and the abutment 48 on the hollow boss 46.

It will be observed that the chambers 80 and 66 are independent of one another and are variable in capacity, depending upon the position of the respective diaphragms 74 and 62. The diaphragms provide flexible wall means interposed between chambers 80 and 66.

A third chamber 84 is formed by the hollow casing 56 and the diaphragms 74 and 62, and this chamber 84 carries an inter-connecting member 86 between the diaphragm 74 and the diaphragm 62. The inter-connecting member 86 is provided with a head section 88. The central section 90 of the diaphragm 74 is clamped between the left side of head 88 and the right side of a plate 92 and the plate is held in place by a screw 94 which is threaded into the left end of the shank 96 of the member 86. The central section 98 of the diaphragm 62 is clamped between the right end of shank 96 of member 86 and a washer 100. The washer is clamped in position by a screw 102 which is threaded into the right end of shank 96.

An endless groove 104 is formed in the periphery of the casing 56. A hole 106 is drilled from groove 104 into the interior of the chamber 84. A like hole 108 is drilled in the outer casing to register with the groove 104. By providing the holes 106 and 108 and the groove 104, the interior of the chamber 84 can breathe, i.e., the pressure is maintained constant regardless of the movement of the diaphragms. This is necessary in view of the fact that the movement of the diaphragm 74 has a greater area for moving air than the diaphragm 62.

A compression coil spring 110 is disposed in chamber 66 and is interposed between the washer 100 and a spring abutment 111. This spring 110 normally urges the diaphragm 62, the inter-connecting member 86 and the diaphragm 74 to the left. The compression of the spring is adjustable through a rod 112 having the end 114 thereof threaded into the elbow 70. Compression force of the spring 110 is increased by moving the rod to the left and the compression force is decreased by moving the rod to the right. The abutment 111 is provided with holes to innterconnect chamber 66 with the coupling 70. An O-ring 116 seals the opening through which the rod extends.

Due to the differential in capacity between chamber 80 and chamber 66, a relatively large variation in pressure in chamber 80 effects a relatively small change in pressure in chamber 66. In this manner the movement of the indicator, controlled by the pressure change in chamber 66, is relatively small compared to the pressure change in chamber 80.

The liquid gauge is used here merely for illustrative purposes and to illustrate this form of the invention. The chamber 66, the coupling 68, the elbow 70, the coupling 72 and the lower portion of the tube 38 contain a liquid preferably of the opaque type. In the embodiment illustrated a relative change in hydrostatic level in the tank 22 causes only a relatively small variation of movement in the liquid tube 38 and its upper section 40.

It will be appreciated that the relative sizes of the diaphragms 74 and 62 are merely for illustrative purposes and can be varied to suit the particular needs. Also it will be appreciated that several of these differential, fluid pressure responsive elements can be connected in series, that is the chamber 66, instead of being connected directly to the tube 38, can be connected to a chamber 80 of a second like element 34.

In the embodiment shown in FIG. 4, the differential of registering, for example hydrostatic pressure, is the reverse of that shown in the FIGS. 1, 2 and 3. In the embodiment FIG. 4, the differential, fluid pressure responsive element 134 includes an outer casing 144, which together with a diaphragm 174 provides an actuating chamber 180. The cap 52, together with the diaphragm 162 provides a chamber 166 which is responsive to movements of diaphragm 174 and consequently responsive to the pressure changes in chamber 180. The diaphragms are interconnected by the member 86 as in FIG. 3. A compression type coil spring 210 is disposed in chamber 166 and its compression value is adjusted by the threaded rod 112.

Inasmuch as the capacity of chamber 180 is relatively small compared with that of chamber 166, small variations in pressure in chamber 180 effect a relatively large capacity change in chamber 166, resulting in a relatively large movement to be imparted in the indicator, i.e., a small movement of diaphragm 174 effects a relatively large movement of liquid in the tube 38.

Again the relative sizes of diaphragms 174 and 162 are merely for illustrative purposes, and, it will be understood that elements like 134 can be connected in series, i.e., the chamber 166 can be connected with a chamber 180 of a second element 134, and the chamber 162 of the second element can be connected directly with a tube 38 or to a chamber 180 of a third element like 134.

Referring again to FIGS. 1, 5 and 6, the fluorescent strip 42 is sufficiently narrow compared to the width of the column of opaque liquid whereby as opaque liquid rises in the tube section 40, it progressively obscures the strip. Suitable indica can be placed on the front of the strip 42 to indicate the height of the liquid in the tank. In this manner, the height of liquid in the tank can be observed in dark rooms or at night.

From the foregoing, it is apparent that there has been provided a simple, efficient and relatively inexpensive pressure indicating system. By use of the differential, fluid pressure responsive element, the indicator need not have height equal to the height of the liquid in the vessel. For example, the liquid height indicator for a large water storage tank can be only a few inches in height.

While the forms of embodiment herein shown and described constitute preferred forms, it is to be understood that other forms may be adopted within the scope of the claims that follow.

I claim:
1. A pressure indicating system, comprising in combination:
  (A) a pressure responsive indicator;
  (B) means forming:
    (1) a closed variable capacity chamber having a flexible wall, connected to a source of variable pressure, said chamber being variable in capacities in response to variations in pressure in said source,
    (2) a second closed variable capacity chamber having a flexible wall connected with the flexible wall in the first mentioned chamber and responsive to variations in capacities in the first mentioned chamber for varying the pressure in the second mentioned chamber, said second mentioned chamber having a different capacity than the first mentioned chamber, the area between the chambers being subjected constantly to the environment surrounding the chambers said second mentioned chamber being provided with an opening;
  (C) a second means for varying the pressure in the second mentioned chamber, said second mentioned means including:
    (1) a spring disposed in the second mentioned chamber,
    (2) an adjustable member accessible from the exterior of the first mentioned means for varying the effect of the spring;
  (D) means responsive to variations in pressures in the second mentioned chamber for actuating the pressure responsive indicator;
  (E) a perforated abutment in the second mentioned chamber, said abutment being disposed at the opening in the second mentioned chamber, said spring being interposed between the flexible wall in the second mentioned chamber and the abutment, said adjusting member having a portion engaging the abutment.

2. A pressure indicating system as defined in claim 1 characterized in that the means which is responsive to the variations in pressure in the second mentioned chamber is a tube and coupling means connecting the opening in the second mentioned chamber with the pressure responsive indicator, and further characterized in that said adjustment member includes a portion engaging the abutment and extending through the coupling means.

References Cited

UNITED STATES PATENTS

| | | | |
|---|---|---|---|
| 2,883,995 | 4/1959 | Bialous et al. | 73—395X |
| 3,283,584 | 11/1966 | Coffing | 73—406X |

FOREIGN PATENTS

| | | | |
|---|---|---|---|
| 1,057,817 | 11/1953 | France | 73—406 |

DONALD O. WOODIEL, Primary Examiner

U.S. Cl. X.R.

73—395